April 12, 1960   M. USHKOW   2,932,386
COMBINATION MOLD AND DISPENSER
Filed Feb. 6, 1957   2 Sheets-Sheet 1
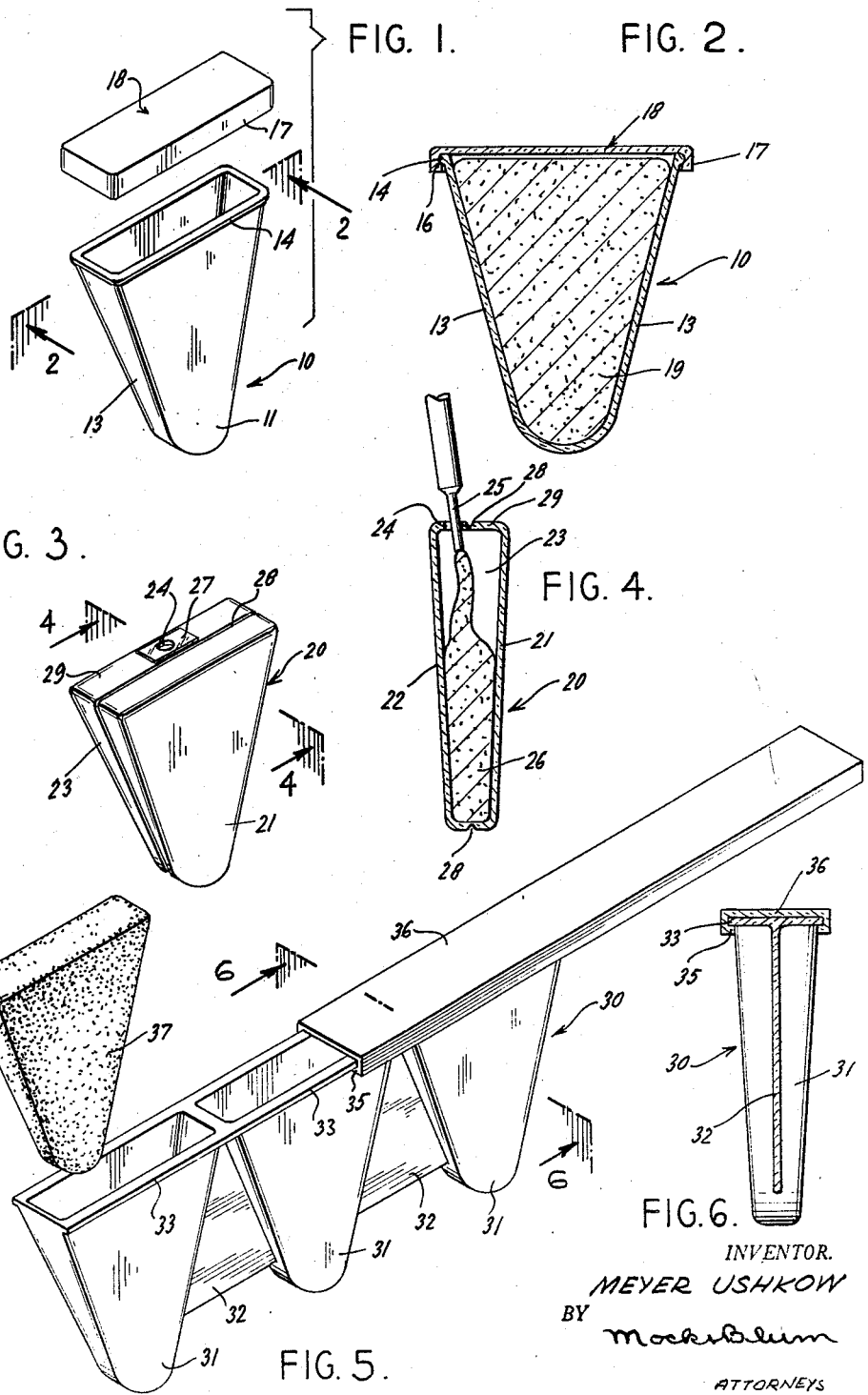
INVENTOR.
MEYER USHKOW
BY Mock & Blum
ATTORNEYS April 12, 1960   M. USHKOW   2,932,386
COMBINATION MOLD AND DISPENSER
Filed Feb. 6, 1957   2 Sheets-Sheet 2
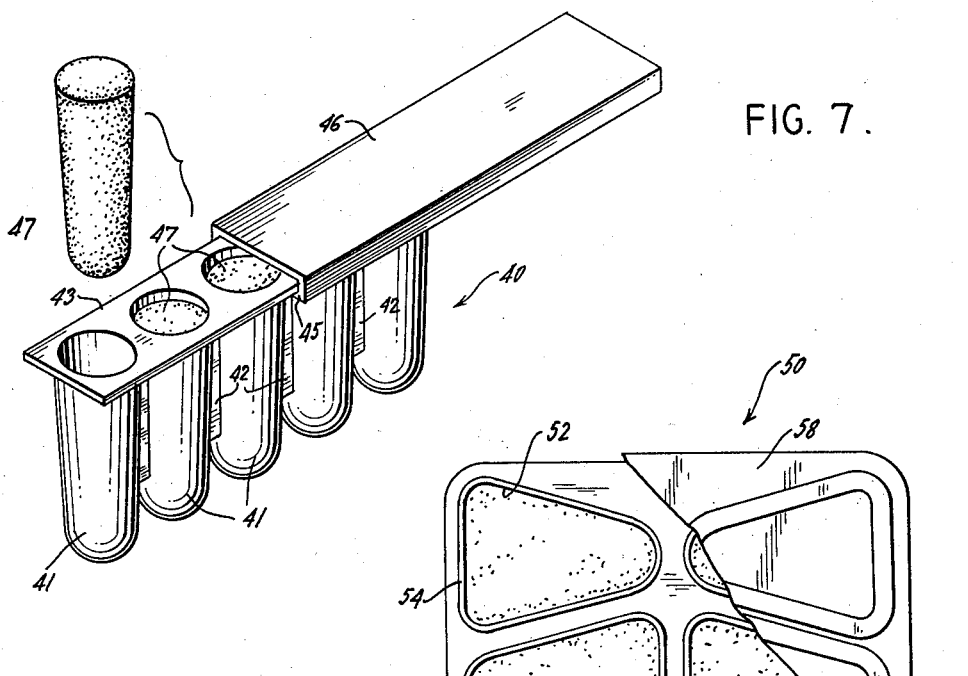
FIG. 7.
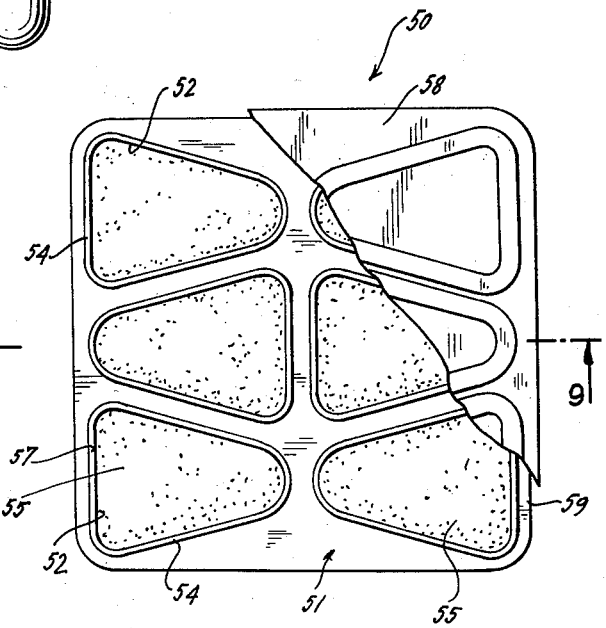
FIG. 8.
FIG. 9.
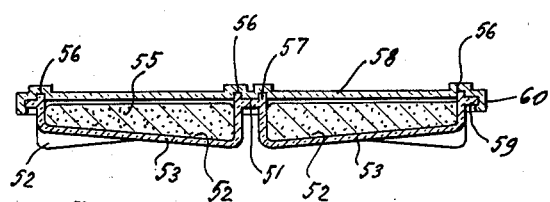
FIG. 10.
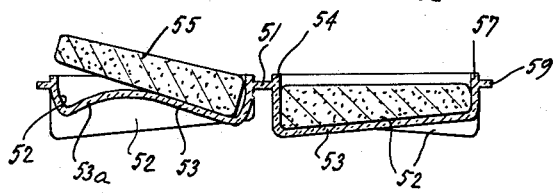
INVENTOR.
MEYER USHKOW
BY
ATTORNEYS United States Patent Office 2,932,386
Patented Apr. 12, 1960

2,932,386

COMBINATION MOLD AND DISPENSER

Meyer Ushkow, Jamaica Estates, N.Y., assignor to Rich Hill Drug Co., Inc., Richmond Hill, N.Y., a corporation of New York Application February 6, 1957, Serial No. 638,642

3 Claims. (Cl. 206—56)

This invention relates to the manufacture, packaging and dispensing of formable articles of manufacture, such as suppositories, lipsticks, and the like.

Ordinarily, the ingredients for deformable types of articles are prepared or compounded and then poured or injected into a mold and allowed to set to the desired shape. After the material has completely set, the molded article is removed from the mold, wrapped, and packaged for sale. It has been found that this procedure not only requires a substantial amount of time and is costly, but under certain temperature conditions the molded materials will lose their molded shape or form, or will melt, thereby detracting from their usefulness and becoming inadequate for the purpose for which they were designed. Furthermore, many of these articles that are formed of material having a substantially low melting point, very readily become deformed by their own weight or by pressure exerted by other similar elements in the package under only slightly higher than normal temperature conditions. Of course, whenever these packages are carried by the person, in a pocket or handbag, damage and inconvenience can result from stains caused by the leaking material.

Accordingly, an object of this invention is to provide a method and device for manufacturing and dispensing deformable articles of manufacture, in which the shape of the article is retained until used and which prevents the leakage of melted material therefrom.

Another object of the present invention is to provide a combination mold, holder, and dispenser device for deformable articles of manufacture that is simple and inexpensive in construction, efficient in operation, and which will overcome the aforementioned difficulties.

A still further object of the present invention is to provide a method for molding, storing, and dispensing deformable articles of manufacture that utilizes a minimum number of steps, avoids waste of article and packaging material, and which can be applied to various types of articles.

A more specific object of the present invention is to provide a combination mold, storage container, and dispenser constructed of a preferentially pliable material that is adapted to directly receive a fluent mass of material so as to mold it to a predetermined shape, wherein the mass is stored therein until ready for use, at which time the article is removed from the device.

All of the foregoing and still further objects and advantages of this invention will become apparent from the following specification, taken in connection with the accompanying drawings, wherein:

Figure 1 is an exploded perspective view of a device made in accordance with one form of the present invention;

Figure 2 is a longitudinal cross sectional view taken along line 2—2 of Figure 1, with the cover in position;

Figure 3 is a perspective view of a modified form of the device made in accordance with the present invention;

Figure 4 is a transverse cross sectional view taken along line 4—4 of Figure 3, showing the device being filled with a fluent material;

Figure 5 is an exploded perspective view of a device made in accordance with another form of the present invention;

Figure 6 is a transverse cross sectional view taken along line 6—6 of Figure 5;

Figure 7 is an exploded perspective view of a device made in accordance with the modification shown in Figures 5 and 6, but showing the provision of an article of different shape;

Figure 8 is a top plan view, with parts broken away, of a still further modified form of the present invention;

Figure 9 is a transverse cross sectional view taken along line 9—9 of Figure 8; and Figure 10 is a view similar to Figure 9, showing the manner in which a single article is removed from the device.

Referring now to the drawings, and more particularly to Figures 1 and 2 thereof, a combination mold, holding, and dispenser device 10 made in accordance with one form of the present invention is shown to include a thin wall structure defining an interior compartment of substantially inverted pyramidal shape, having substantially flat front and back faces 11 and a pair of downwardly tapering sides 13. The open end of the container is provided with an outwardly disposed peripheral bead 14 that is adapted to cooperate with the inwardly extending bead 16 of the sides 17 of a removable cover 18.

In use, the container or mold 10 is filled with a fluent material either by injection or by pouring, after which the cover 18 is secured thereto and the material permitted to set. The molded article 19 is then stored within the container until it is ready for use, whereupon the cover is removed and the article 19 removed. For purposes of explanation, the article 19 is shown to be in the form of a suppository that is usually manufactured from a combination of chemical ingredients that are very sensitive to temperature changes and easily become deformable or melt at temperatures slightly above normal room temperatures. For example, certain types of suppositories are manufactured from a combination of oil, lanolin, and cocoa butter. The mold 10 is preferably constructed of a flexible plastic material, such as polyethylene or polystyrene, so that the thin walls thereof can be slightly flexed to facilitate the removal of the article for use. While it has been recognized that certain ingredients, such as cocoa butter, do tend to adhere to polyethylene and polystyrene, such adhesion can be overcome by treating the mold, such as with silicone, before the fluent material is inserted therein. Mold 10 may be manufactured, of course, from any desired material, but manufacture from a flexible plastic material is preferred.

Referring now to Figures 3 and 4 of the drawings, a modified form of construction is shown, wherein the device 20 is also of pyramidal shape and is provided with downwardly tapering thin front and back sides 21, 22, downwardly tapering thin end walls 23, and a thin top wall 29. The said top wall 29 is provided with a small opening 24 through which an injection needle 25 is adapted to extend, whereby the interior of the device can be filled with a pressurized stream of fluent material or by any other means of filling. Upon setting, the material 26 assumes the shape of the mold so as to form the suppository 26. After filling, the opening 24 is closed, such as with adhesive tape 27 or by heat sealing. A continuous cleavage groove or indentation 28 extends around the entire periphery of the sides and top wall. The said groove provides a weakened portion which may be readily fractured by a fingernail, a knife, or the like, so that the suppository or other article 26 may be removed from the device when desired.

In Figures 5 and 6 a still further modified form of device 30 is shown, wherein a plurality of similar thin-walled containers 31 are integrally formed together in alignment. In order to prevent the flexing of the container about their connecting portions, substantially flat ribs or gussets 32 fill the space defined by the diverging walls thereof. Outwardly extending flanges 33 define a pair of continuous longitudinally extending tracks that are received within channels 35 formed by the side walls of an elongated cover or closure member 36. Each of the compartments 31 are filled in the aforementioned manner, after which the closure 36 is adapted to seal all of the containers. Thus, each suppository 37 may be removed from the associated container 31, as required, without disturbing the suppositories contained within the other similar connected compartments.

In Figure 7, for purposes of further illustration, a similar type thin-walled multiple compartment unit 40 is shown, wherein each compartment 41 is of conoidal shape that is common to lipsticks or lip pomade crayons 47. Each of the spaces between the adjacent containers is filled with a substantially flat reinforcing rib 42, while the open ends of the container include an outwardly extending integral flange 43 that define side tracks which are slidably received within channels 45 formed by the depending sides of the cover 46. Thus, a single lip pomade crayon 47 may be removed from the associated compartment 41 without affecting the other similar crayons disposed in the adjacent compartments.

In Figures 8 through 10, a still further modified form 50 of the present invention is shown to include a substantially flat tray 51 that is divided into a plurality of pre-arranged compartments 52 that are defined by spaced thin side walls 54 and downwardly inclined thin bottom walls 53. Separate grooves 56 in a single cover member 58 are adapted to receive the upwardly extending ribs 57 that form extensions of the side walls 54, so as to provide an effective seal for each one of the compartments. As is more clearly shown in Figure 10, a peripheral side rib 59, forming an extension of the tray 51, is adapted to be securely engaged by the downwardly depending peripheral flange 60 of the cover member 58, thereby effectively sealing the entire tray and the compartments 52 contained therein. The respective ribs and flanges, together with the associated grooves 56, cooperate to prevent any fluent material resulting from the melting of the suppositories 55 contained therein from running into adjacent compartments, thereby adversely affecting the shape of the separate articles 55. On the other hand, it may be found desirable to eliminate the upwardly extending ribs 57 so that the compartments may be filled merely by drawing a quantity of fluent material over the top of the tray 51 and following it with a blade to smooth the top surface thereof. In either event, at least the bottom wall 53 of each compartment is constructed of a flexible material so that it may be depressed or flexed, such as by a finger, to a distorted shape 53a, as shown in Figure 10, to facilitate the removal of the associated article 55.

It will be recognized that each of the described devices may be used to mold, hold, and dispense any of the aforementioned articles. Thus, a single disposable unit, constructed of inexpensive material, is used during the manufacture of the article and automatically forms an attractive and efficient packaging device that may be used by the purchaser to dispense individual articles, as needed. It will be noted that substantially any shape of article may be manufactured according to this method, and that various types and colors of materials may be used to form the compartments. Furthermore, while this invention is of particular merit in connection with the handling of deformable types of articles, such may also be used to receive and hold articles that may have a pre-fixed or pre-set shape. Also, while in Figs. 5 to 7 there has been illustrated multiple compartment units, the respective devices can be of a single unit construction.

While this invention has been described with particular reference to the constructions shown in the drawings, it is to be understood that such is not to be construed as imparting limitations upon the invention, which is best defined by the claims appended hereto.

What is claimed is:

1. A combination mold, holding and dispenser device for articles of manufacture comprising a deformable container, said container having a plurality of opposing side walls, one of said side walls being shorter than its other opposing side wall and a bottom wall extending across said container at an inclined angle to join said side walls, said side walls extending above said mold in the form of upwardly extending ribs, peripheral side ribs extending from said side walls substantially transversely to said upwardly extending ribs, and a cover engaging and sealing said container, said cover including groove means receiving said upwardly extending ribs and an annular-flange member extending around said transverse ribs.

2. A combination mold, holding and dispenser device for articles of manufacture comprising a deformable container having a plurality of opposing side walls, said side walls extending above said mold in the form of upwardly extending ribs, peripheral side ribs extending from said side walls substantially transversely to said upwardly extending ribs, and a cover engaging and sealing said container, said cover including groove means receiving said upwardly extending ribs and an annular-flange member extending around said transverse ribs.

3. A combination mold, holding and dispenser device for articles of manufacture comprising a deformable container having opposing side walls tapering toward each other, additional side walls joining said opposing side walls and forming a wedgelike container, one of said additional side walls being shorter than the other, and a bottom wall extending across said container at an inclined angle to join said side walls, the shorter side wall being adjacent to the tapered end of the opposing side walls, said side walls extending upwardly above said mold in the form of vertical ribs, peripheral side ribs extending transversely from said side walls, and a cover having a groove conformably receiving said vertical ribs, and an annular-flange member on said cover extending around said transverse ribs to seal said container.

References Cited in the file of this patent

UNITED STATES PATENTS

| 2,096,825 | Roman | Oct. 26, 1937 |
| 2,530,127 | Kubik | Nov. 14, 1950 |
| 2,612,261 | Percopo | Sept. 30, 1952 |
| 2,797,805 | Berard | July 2, 1957 |

FOREIGN PATENTS

| 210,940 | Great Britain | Feb. 14, 1924 |
| 682,877 | France | Feb. 30, 1930 |
| 55,629 | France | May 21, 1952 |
| 1,049,901 | France | Apr. 26, 1953 |
| 1,081,229 | France | June 9, 1954 |
| 1,091,839 | France | Nov. 3, 1954 |
| 1,091,856 | France | Nov. 3, 1954 |